(12) United States Patent
Igra

(10) Patent No.: US 7,971,138 B2
(45) Date of Patent: Jun. 28, 2011

(54) COMMON DESIGN FOR WEB PAGES THROUGH EMPLOYMENT OF MASTER SPECIFICATIONS

(75) Inventor: Mark S. Igra, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 1527 days.

(21) Appl. No.: 09/816,552

(22) Filed: Mar. 23, 2001

(65) Prior Publication Data

US 2002/0138516 A1    Sep. 26, 2002

(51) Int. Cl.
G06F 17/00    (2006.01)
(52) U.S. Cl. ......... 715/236; 715/201; 715/209; 715/243
(58) Field of Classification Search .................. 715/522, 715/513, 517, 201, 209, 236, 243
See application file for complete search history.

(56) References Cited

U.S. PATENT DOCUMENTS

| | | | |
|---|---|---|---|
| 5,860,073 A * | 1/1999 | Ferrel et al. .................... | 715/522 |
| 5,895,477 A | 4/1999 | Orr et al. | |
| 5,911,145 A * | 6/1999 | Arora et al. .................... | 715/207 |
| 6,023,714 A * | 2/2000 | Hill et al. ....................... | 715/513 |
| 6,026,433 A | 2/2000 | D'Arlach et al. | |
| 6,112,242 A | 8/2000 | Jois et al. | |
| 6,161,114 A * | 12/2000 | King et al. ..................... | 715/517 |
| 6,199,082 B1 * | 3/2001 | Ferrel et al. .................... | 715/522 |
| 6,219,680 B1 | 4/2001 | Bernardo et al. | |
| 6,230,173 B1 * | 5/2001 | Ferrel et al. .................... | 715/513 |
| 6,263,352 B1 | 7/2001 | Cohen | |
| 6,304,886 B1 | 10/2001 | Bernardo et al. | |
| 6,313,835 B1 | 11/2001 | Gever et al. | |
| 6,772,396 B1 * | 8/2004 | Cronin et al. .................. | 715/513 |
| 6,792,577 B1 * | 9/2004 | Kimoto .......................... | 715/522 |
| 7,178,101 B2 * | 2/2007 | Tunning ......................... | 715/236 |
| 7,594,166 B1 * | 9/2009 | Ramakrishna et al. ........ | 715/234 |
| 2001/0044809 A1 * | 11/2001 | Parasnis et al. ................ | 707/513 |
| 2002/0010716 A1 * | 1/2002 | McCartney et al. ........... | 707/517 |
| 2002/0152245 A1 * | 10/2002 | McCaskey et al. ............ | 707/530 |
| 2003/0079177 A1 * | 4/2003 | Brintzenhofe et al. ........ | 715/500 |

OTHER PUBLICATIONS

Lie et al., "Cascading Style Sheets, level 1" W3C Recommendation Dec. 17, 1996, revised Jan. 11, 1999 (www.w3.org/TR/CSS1).*
Pemberton et al., "XHTML 1.0: The Extensible HyperText Markup Language" W3C Recommendation Jan. 26, 2000 (www.w3.org/TR/2000/REC-xhtml1-20000126/).*

* cited by examiner

*Primary Examiner* — William L Bashore
*Assistant Examiner* — Gregory A Distefano
(74) *Attorney, Agent, or Firm* — Squire, Sanders & Dempsey (US) LLP

(57) ABSTRACT

A master specification is provided to specify a common design for a number of resultant web pages to be generated. The common design includes common content placement, and at least one of a common style and a common navigation arrangement. The content of a first resultant web page is defined employing a first subordinate web page specification, including reference to the master specification for content placement, and at least one of style and navigation. The content of a second resultant web page is similarly defined. In turn, the first and second resultant web pages are generated with first and second contents being placed, styled and/or having the common navigation arrangement in accordance with the master specification.

29 Claims, 4 Drawing Sheets

102 ~
```
<Head> ~ 112
Title=Common Navigation;
Style
</Head>
<Body> ~ 114
Navigation
</Body>
```

104 ~
```
<Head> ~ 132
Title=Page1; Style
</Head>
<Body> ~ 134
<Frameset>
  <Frame1> ~ 136
      Common Navigation
  </Fram1>
  <Frame2> ~ 138
      First Content
  </Frame2>
</Frameset>
</Body>
```

Figure 1

Prior Art

US 7,971,138 B2

COMMON DESIGN FOR WEB PAGES THROUGH EMPLOYMENT OF MASTER SPECIFICATIONS

BACKGROUND OF THE INVENTION

1. Field of the Invention

The present invention relates to the field of data processing. More specifically, the present invention relates to the efficient creation and maintenance of a common design for a web site or web based applications.

2. Background Information

With advances in integrated circuit, microprocessor, networking and communication technologies, increasing numbers of devices, in particular, digital computing devices, are being networked together. As a result of this trend of increased connectivity, increasing numbers of applications that are network dependent are being deployed. Examples of these network dependent applications include, but are not limited to, email, net-based telephony, world wide web (WWW), and various types of web based e-commerce, commonly referred to as web sites or web based applications. Further, increasing numbers of software applications that were traditionally licensed or distributed through discrete distribution medium, such as diskettes, CDROMs and the like, are being distributed online or offered as web based applications, through private intranets or public networks like the Internet.

Conventionally, web pages of most web sites or web-based applications are typically coded using a mark up language, such as HTML or XHTML. The associated processing logic is typically implemented using a "script" language such as CGI, Javascript, Perl and so forth. Most web sites or web based applications, for at least aesthetic and/or usability reasons, desire a common design, that is having a consistent approach to at least styling elements, such as fonts, color schemes and so forth, and navigation among the pages.

Current prior art approaches to effectuate a common or consistent design to a web site or a web based application are inefficient. FIG. 1 illustrates one such technique. As illustrated, a designer would create navigation page 102 having a navigation arrangement specified in <body> section 114 (which functions as a "content" section). The style elements, such as font, color, and so forth would be specified in <head> section 112 (which functions as a "control" section). These style elements may be explicitly enumerated, or in the alternative, a reference to a style sheet containing these definitions may be specified instead. To effectuate the common design, the designer or designers would replicate (e.g. through cut and paste) the same style specification in each <head> section 132 of each page 104. Further, navigation page 102 would be referenced as content source in one of the <frame> sections 136 of <body> section 134 of each page. The substantive content of each page would be specified employing one or more other <frame> sections 138.

As can be seen, the style and navigation information, at least the references to their definitions, are maintained in each page 102-104. Accordingly, if certain changes are to be made in one or more style elements or the navigation arrangement of the web site or web-based application, the changes must be made in each and every one of the web pages carrying the information. The process, is cumbersome and error prone. This is true, whether the changes are made with the employment of certain web development tool that can automatically ripple the changes to each and every web page, or through a cut and paste approach.

Alternatively, the common design may be effectuated through what is known in the art as "server side includes" (SSI). However, SSI requires one main URL to be employed for all links of a web site or a web-based application. The requirement makes URLs difficult to understand, and as a result makes building links to pages more difficult. Further, the approach makes it very difficult for each page to have custom content in the <head> section. Moreover, if all pages of a web site or a web based application use SSI to define the "common areas", the pages would have to be changed whenever the shape of the common area changes.

Thus, a more efficient approach to facilitating a common design for a web site or web based application is desired.

SUMMARY OF THE INVENTION

A master specification is provided to specify a common design for a number of resultant web pages to be generated. The common design includes common content placement, and at least one of a common style and a common navigation arrangement. The content of a first resultant web page is defined employing a first subordinate web page specification, including reference to the master specification for content placement, and at least one of style and navigation. The content of a second resultant web page is similarly defined. In turn, the first and second resultant web pages are generated with first and second contents being placed, styled and/or having the common navigation arrangement in accordance with the master specification.

In one embodiment, the master specification, as well as both the first and second subordinate web page specifications, are expressed using the XHTML language. The style and/or navigation arrangement are specified in the <head> section. The common placement is specified in the <body> section. Both the first and second subordinate web page specifications also specify other control information in the <head> section. Each of the generation of the first and second resultant web pages includes merging the <head> sections of the master specification and the corresponding one of the first and second subordinate web page specifications.

In one embodiment, the first and the second resultant web pages are referenced by first and second URLs respectively, and the merged specifications defining the first and second resultant web pages are dynamically generated when the first and second resultant web pages are requested, respectively.

BRIEF DESCRIPTION OF DRAWINGS

The present invention will be described by way of exemplary embodiments, but not limitations, illustrated in the accompanying drawings in which like references denote similar elements, and in which:

FIG. 1 illustrates a prior art approach to effectuating a common design among web pages of a web site or web based application;

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well-known features are omitted or simplified in order not to obscure the present invention.

Parts of the description will be presented in terms of operations performed by a processor based device, using terms such as data, style, navigation, links, and the like, consistent with the manner commonly employed by those skilled in the art to convey the substance of their work to others skilled in the art. As well understood by those skilled in the art, the quantities take the form of electrical, magnetic, or optical signals capable of being stored, transferred, combined, and otherwise manipulated through mechanical and electrical components of the processor based device; and the term processor include microprocessors, micro-controllers, digital signal processors, and the like, that are standalone, adjunct or embedded. Further, for the purpose of this application, the terms "web site" and "web based application" should be considered synonymous and interchangeable.

Various operations will be described as multiple discrete steps in turn, in a manner that is most helpful in understanding the present invention, however, the order of description should not be construed as to imply that these operations are necessarily order dependent. In particular, these operations need not be performed in the order of presentation. Further, the description repeatedly uses the phrase "in one embodiment", which ordinarily does not refer to the same embodiment, although it may.

Overview

Figure 2:
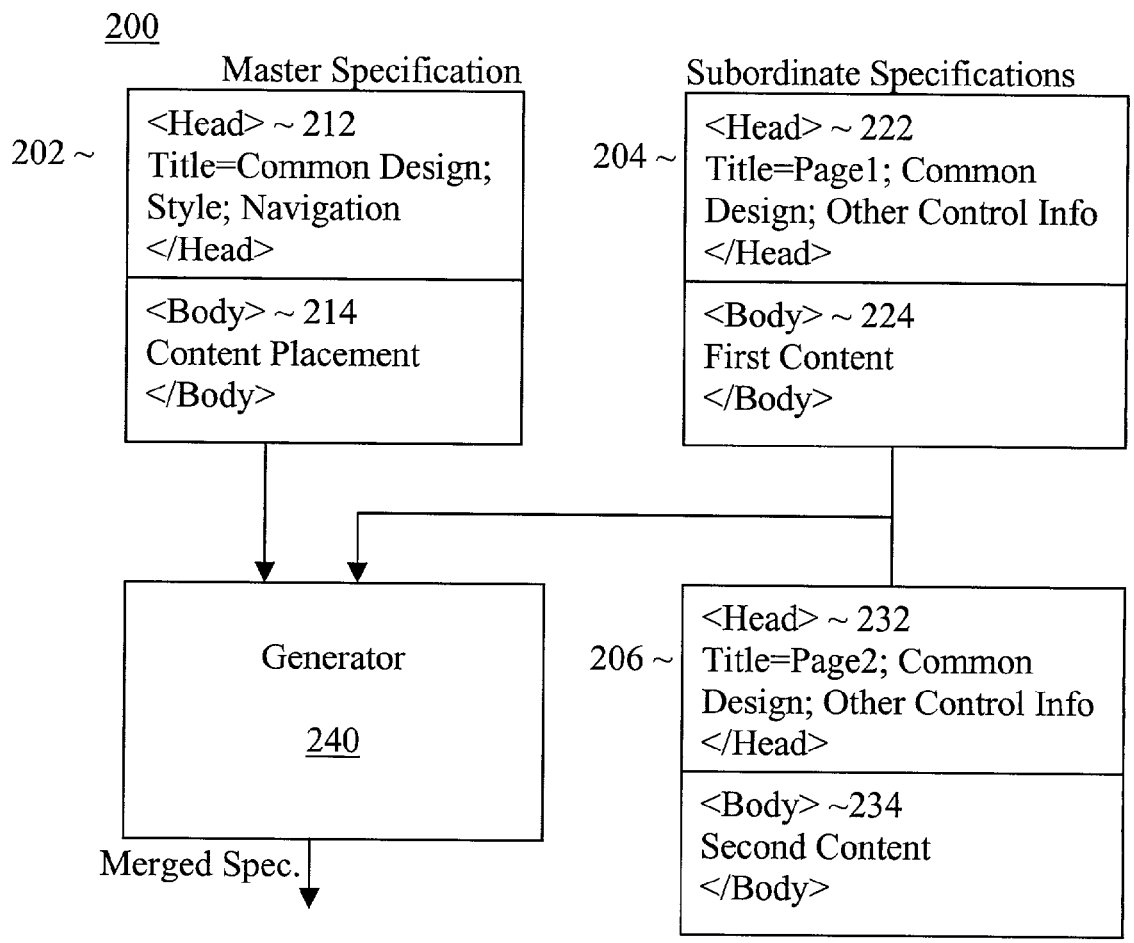
FIG. 2 illustrates the present invention, including the master specification, to effectuate a common design among web pages, in accordance with one embodiment.

Referring now to FIG. 2, wherein a block diagram illustrating the present invention for creating and maintaining a common design among web pages through the employment of a master specification, in accordance with one embodiment, is shown. As illustrated, in accordance with the present invention, master specification 202 is employed to control the common design of a number of web pages to be generated. The common design includes content placement, and at least one of style and navigation. As alluded earlier, content placement refers to the spatial placement of substantive content in a web page, whereas style refers to style elements such as fonts, color, and so forth. Navigation refers to the supported transitions between the web pages. As will be readily apparent from the description to follow, by virtue of the employment of master specification 202, control, and in particular, updating or making modification to the common design become much easier, without many of the prior art disadvantages discussed earlier.

As shown, master specification 202 includes <head> section 212 and <body> section 214. Specified in <head> section 212 is the style specification and/or navigation specification for the common design of the web pages. As described earlier, specification of the style may be expressly made through explicit enumeration of the style elements. In the alternative, specification of the style may be implicitly made through a specification of a style sheet. Similarly, navigation may be explicitly defined or by reference to a navigation specification, wherein the common navigation scheme is defined. The common navigation scheme may be laid out in any one of a number of conventional designs, including but are not limited to horizontal and vertical layouts.

Specified in the <body> section 214 is the spatial placement of content, and more importantly, the content or the source of the content is to be specified by a subordinate web page specification. A subordinate web page specification is a web page specification that references master specification 202, and deferring to master specification 202 for content placement, and at least one of style and navigation.

As illustrated, each of subordinate web page specifications 204/206 includes at least <head> section 222/232 and <body> section 224/234. Specified in <head> section 222/232 is master specification 202 to which subordinate web page specification 204/206 defers to in terms of content placement and at least one of style and/or navigation for the web page being specified. However, under the present invention, notwithstanding the deferral to master specification 202, each subordinate web page specification 204/206 may specify additional controls in <head> section 222. Specified in <body> section 224/234 is the substantive content of the respective web page being specified.

Thus, when multiple web pages are "realized" by combining the substantial content as defined by the corresponding subordinate web page specifications, such as specifications 206 and 204, and the common design specified by master specification 202, a collection of web pages having a common design, the design specified by master specification 202, results.

Continuing to refer to FIG. 2, while for ease of understanding, only one content placement 214 is shown for master specification 202, as those skilled in the art would appreciate, the present invention may be practiced with master specification 202 having one or more content placements 214. The content of each content placement 214 is sourced from a content source defined by a subordinate web page specification 204. Further, variable controls may be specified for the common design in the control (<head>) section 212 of master specification 202, with the control values for the variable controls to be supplied by the referencing subordinate web page specifications 204.

For the illustrated embodiment, realization of such web pages is achieved by providing master specification 202 and the subordinate web page specifications 204-206 to generator 240, which in response generates merged specifications for the resultant web pages. The resultant web pages are in turn rendered in accordance with the merged specifications. In a preferred embodiment, each resultant web page is referenced by its own uniform resource locator (URL), and the generation of the merged specification for the resultant web page is performed, when the resultant web page is requested. That is, the merged specifications, and in turn, the resultant web pages are generated on demand, in real time, on an as needed basis.

Accordingly, there isn't an inventory of pre-generated web page specifications. Thus, when the common design changes, or updates/modifications to the common design are necessary, the updates/modifications may be made without having to ripple the changes through a large number of web page specifications. More importantly, by having master specification 202 control spatial placement of the substantive content specified by the subordinate web page specifications, no modifications to the web page specifications are necessary, when the "common area" changes in size and/or shape.

Figure 3:
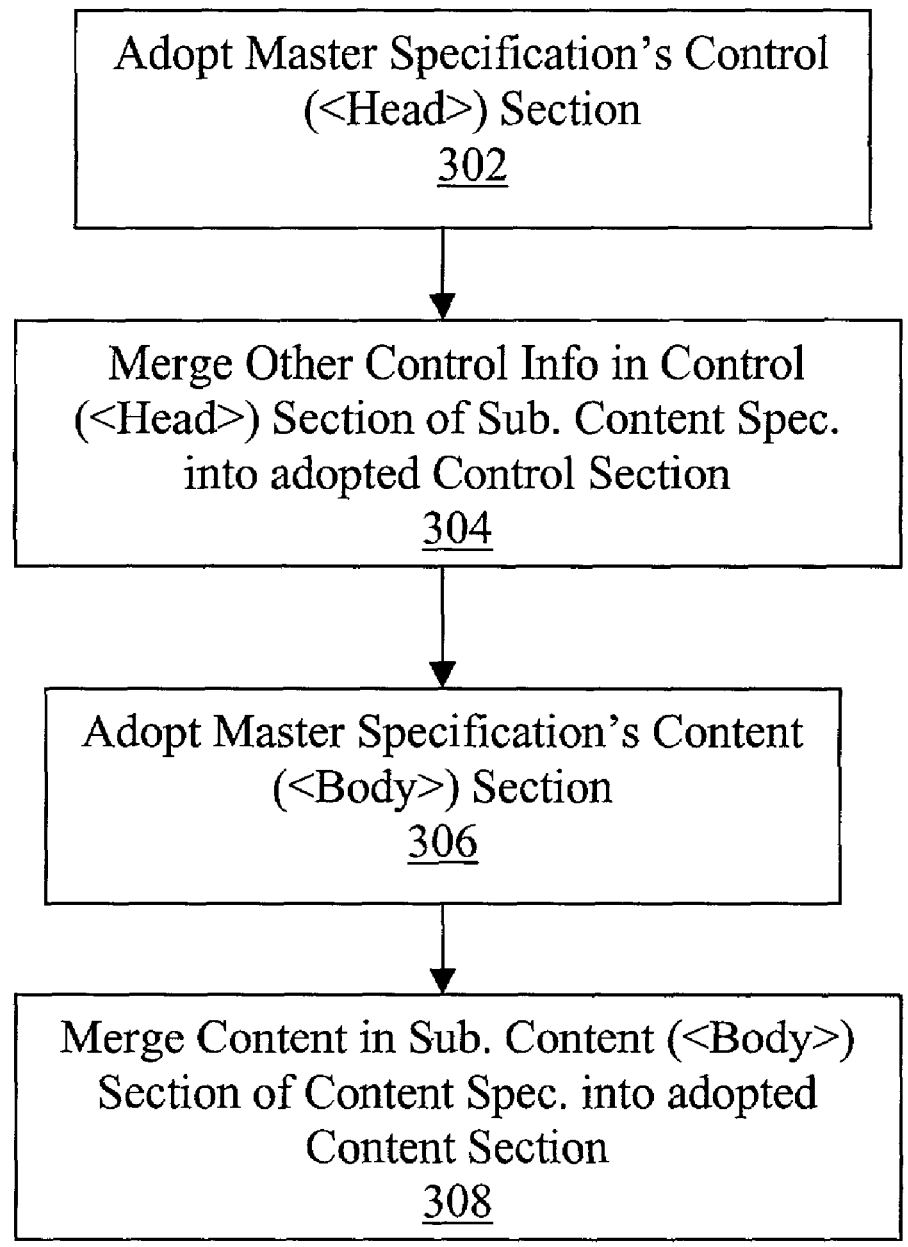
FIG. 3 illustrates the relevant operational flow of generator of FIG. 2, incorporated with the teachings of the present invention to generate a web page using a master specification.

FIG. 3 illustrates the relevant operational flow of generator 240 for generating a merged specification for a resultant web page on demand employing master specification 202. As illustrated, upon invocation, generator 240 first adopts <head> section 212 of master specification 202 (block 302). Next, generator 240 merges the additional control information specified in <head> section 222 of subordinate web page specification 204 into the adopted <head> section (block 304). Accordingly, the earlier described additional supplemental specification of control information by a subordinate web page specification may be effectuated.

Thereafter, generator 240 adopts <body> section 214 of master specification 202 (block 306). As before, generator 240 merges the substantive content specified in <body> section 224 of subordinate web page specification 204 into the adopted <body> section (block 308). Accordingly, the earlier described placement of content under the control of master specification 202 may be effectuated.

Generator 240 may be implemented in any one of a number of programming instructions known in the art. In one embodiment, generator 240 is implemented as a "standalone" utility. In another embodiment, generator 240 is implemented as an integral function of a web server.

Example Computer System

Figure 4:
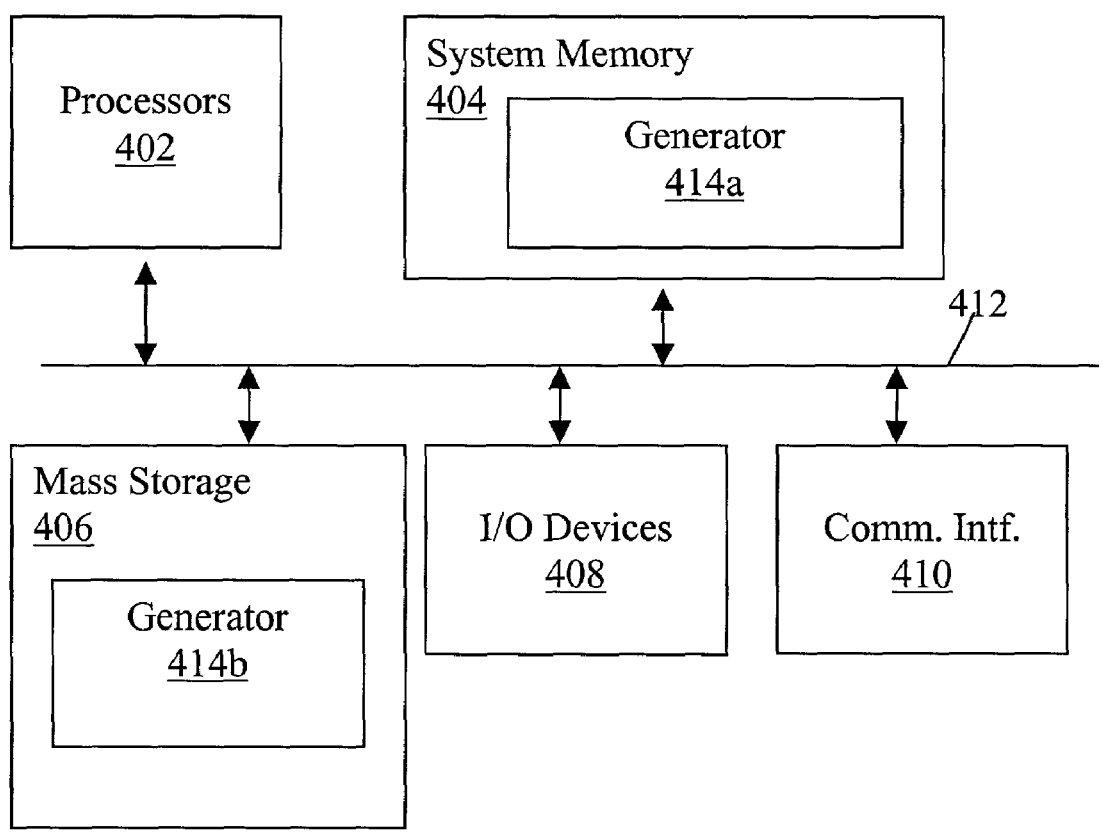
FIG. 4 illustrates an internal component view of a computer system suitable for use to practice the present invention, in accordance with one embodiment.

FIG. 4 illustrates an example computer system suitable for use to practice the present invention in accordance with one embodiment. As shown, computer system 400 includes one or more processors 402 and system memory 404. Additionally, computer system 400 includes mass storage devices 406 (such as diskette, hard drive, CDROM and so forth), input/output devices 408 (such as keyboard, cursor control and so forth) and communication interfaces 410 (such as network interface cards, modems and so forth). The elements are coupled to each other via system bus 412, which represents one or more buses. In the case of multiple buses, they are bridged by one or more bus bridges (not shown). Each of these elements performs its conventional functions known in the art. In particular, system memory 404 and mass storage 406 are employed to store a working copy and a permanent copy of the programming instructions implementing the "generator" function of the present invention (or a component incorpating the "generator" function). The permanent copy of the programming instructions may be loaded into mass storage 406 in the factory, or in the field, as described earlier, through a distribution medium (not shown) or through communication interface 410 (from a distribution server (not shown). The constitution of these elements 402-412 are known, and accordingly will not be further described.

CONCLUSION AND EPILOG

Thus, an improved method and apparatus for effectuating a common design among web pages has been described. While the present invention has been described in terms of the above illustrated embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A web page generation method comprising:
    defining a master specification specifying in a first control section a common style, a common navigation arrangement, and common content placement for each resultant web page to be generated, wherein the common style comprises variable controls;
    defining a first subordinate content specification specifying first content of a first resultant web page, referencing in a second control section the master specification for style, navigation and content placement, and comprising a first subordinate style specified as first subordinate control values;
    defining a second subordinate content specification specifying second content of a second resultant web page, referencing the master specification for style, navigation and content placement, and comprising a second subordinate style; and
    generating said first and second resultant web pages with said first content being placed and styled in accordance with said common content placement and a first merged style that comprises the first subordinate style merged into the common style, and said second content being placed and styled in accordance with said common content placement and a second merged style that comprises the second subordinate style merged into the common style, said first and second resultant web pages having said common navigation arrangement specified by said master specification;
    wherein said first control section of said master specification comprises at least one variable control, and said second control section of said first subordinate web page specification supplies a control value for one of said at least one variable control,
    wherein said first subordinate web page specification further specifies other control information in said second control section; and
    said generating of said first resultant web page further comprises merging said other control information into said first control section.

2. The method of claim 1, wherein said defining of a master specification specifying a common style comprises specifying a reference to a style definition.

3. The method of claim 1, wherein said defining of a master specification specifying a common navigation arrangement comprises specifying a reference to a navigation specification.

4. The method of claim 1, wherein said defining of a master specification specifying a common content placement comprises specifying said common content placement within said master specification.

5. The method of claim 1, wherein each of said defining of a first and a second subordinate content specification specifying first and second content of a first and a second resultant web page is made using a markup language having language elements for specifying control information in a control section, and said referencing of the master specification comprises specifying a reference to said master specification in said control section.

6. A web page generation method comprising:
    receiving a master specification defining a common design for resultant web pages to be generated, specifying in first control section common content placement and at least one of common style and common navigation arrangement for each of said resultant web pages to be generated;
    receiving a first subordinate web page specification defining first content for a first resultant web page to be generated, specifying said first content for said first resultant web page to be generated, and referencing in a second control section the master specification, for content placement and at least one of style and navigation, wherein the first subordinate web page specification comprises a first subordinate style;
    receiving a second subordinate web page specification defining second content for a second resultant web page to be generated, specifying said second content for said second resultant web page to be generated, and referencing the master specification for content placement and at least one of style and navigation, wherein the second subordinate web page specification comprises a second subordinate style;

generating said first and second resultant web pages with said first content being placed, styled and/or having a common navigation arrangement in accordance with said common placement and a first merged style that comprises the first subordinate style merged into the common style, and said second content being placed, styled and/or having a common navigation arrangement in accordance with said common content placement and a second merged style that comprises the second subordinate style merged into the common style, wherein said first control section of said master specification comprises at least one variable control, and said second control section of said first subordinate web page specification supplies a control value for one of said at least one variable control, wherein said first subordinate web page specification further specifies other control information in said second control section; and said generating of said first resultant web page further comprises merging said other control information into said first control section.

7. The method of claim 6, wherein said master specification specifies said common style through a reference to a style definition.

8. The method of claim 7, wherein said master specification specifies said common design employing a markup language having language elements for specifying control information in a control section, and said specification of a reference to a style definition comprises specification of said reference to said style definition in said control section.

9. The method of claim 6, wherein said master specification specifies said common navigation arrangement through specification of a reference to a navigation definition.

10. The method of claim 9, wherein said master specification specifies said common design employing a markup language having language elements for specifying control information in a control section, wherein and said specification of a reference to a said navigation definition comprises specifying a reference to a navigation specification in said control section.

11. The method of claim 6, wherein said master specification specifies said common design employing a markup language having language elements for specifying content in a content section, and said specification of said common content placement comprises specifying said content placement in said content section.

12. The method of claim 6, wherein both of said first and second subordinate web page specifications specify said first and second content of said first and second resultant web pages using a markup language having language elements for specifying control information in a control section, and each of said referencing to the master specification comprises specifying a reference to said master specification in the control section.

13. The method of claim 6, wherein said master specification and said first and second subordinate web page specifications express the respective specifications using a markup language having language elements for specifying control information in a control section;

said specification of at least one of a common style and a navigation arrangement comprises specifying at least one of a reference to a style definition and a reference to a navigation arrangement in the control section of the master specification;

said first and second subordinate web page specifications specify first and second other control information in first and second control sections of the first and second subordinate web page specifications respectively; and each of said generating of said first and second resultant web pages comprises merging said specification of at least one of a reference to a style definition and a reference to a navigation arrangement in the control section of the master specification and the corresponding one of said first and second other control information in the control section of the corresponding one of said first and second subordinate web page specifications.

14. The method of claim 6, wherein said master specification and said first and second subordinate web page specifications express the respective specifications using a markup language having language elements for specifying control information in a control section;

said specification of common content placement comprises specification of a content section whose content is to be included from a referencing subordinate web page specification; and said first and second subordinate web page specifications specify said first and said second content in first and second content sections of said first and second subordinate web page specifications respectively; and each of said generating of said first and second resultant web pages comprises merging a corresponding one of said specified first and second contents in said first and second content sections of said first and second subordinate web page specifications into the content section of the master specification.

15. The method of claim 6, wherein said first and second resultant web pages are referenced by first and second identifiers;

said method further comprises receiving said first and second identifiers requesting for said first and second resultant web pages; and at least said generations of said first and second resultant web pages are performed responsive to the corresponding receiving of said first and second identifiers.

16. An apparatus comprising:

storage medium having stored therein programming instructions, when executed, operate the apparatus to receive a master specification defining a common design for resultant web pages to be generated, specifying in a first control section common content placement and at least one of a common style and a common navigation arrangement for each of said resultant web pages to be generated, wherein the common style comprises variable controls;

receive a first subordinate web page specification defining first content for a first resultant web page to be generated, specifying said first content for said first resultant web page to be generated wherein the first subordinate web page specification comprises a first subordinate style specified as first subordinate control values; and referencing in a second control section the master specification for content placement and at least one of style and navigation;

receive a second subordinate web page specification defining second content for a second resultant web page to be generated, specifying said second content for said second resultant web page to be generated, and referencing the master specification for content placement and at least one of style and navigation, wherein the second subordinate web page specification comprises a second subordinate style;

generate said first and second resultant web pages with said first content being placed, styled and/or having a common navigation arrangement in accordance with said common placement and a first merged style that comprises the first subordinate style merged into the common style, and said second content being placed, styled and/or having a common navigation arrangement in accordance with said common content placement and a second merged style that comprises the second subordinate style merged into the common style; and a processor coupled to the storage medium to execute the programming instructions;

wherein said first control section of said master specification comprises at least one variable control, and said second control section of said first subordinate web page specification supplies a control value for one of said at least one variable control, wherein said first subordinate web page specification further specifies other control information in said second control section; and said generating of said first resultant web page further comprises merging said other control information into said first control section.

17. The apparatus of claim 16, wherein said master specification and both of said first and second subordinate web page specifications express the respective specifications using a markup language having language elements for specifying control information in a control section;

said specification of at least one of a common style and a navigation arrangement comprises specifying at least one of a reference to a style definition and a reference to a navigation arrangement in the control section of the master specification;

said first and second subordinate web page specifications specify first and second other control information in first and second control sections of the first and second subordinate web page specifications respectively; and said programming instructions operate the apparatus to perform each of said generating of said first and second resultant web pages in a manner that includes merging of said specification of at least one of a reference to a style definition and a reference to a navigation arrangement in the control section of the master specification and the corresponding one of said first and second other control information in the control section of the corresponding one of said first and second subordinate web page specifications.

18. The apparatus of claim 16, wherein said master specification and both of said first and second subordinate web page specifications express the respective specifications using a markup language having language elements for specifying control information in a control section;

said specification of common content placement comprises specification of a content section whose content is to be included from a referencing subordinate web page specification; and said first and second subordinate web page specifications specify said first and said second content in first and second content sections of said first and second subordinate web page specifications respectively; and said programming instructions operate the apparatus to perform each of said generating of said first and second resultant web pages in a manner that includes merging a corresponding one of said specified first and second contents in said first and second content sections of said first and second subordinate web page specifications into the content section of the master specification.

19. An article of manufacture comprising:

a storage medium;

and a plurality of programming instructions stored in said storage medium to:

program an apparatus to enable the apparatus to:

receive a master specification defining a common design for resultant web pages to be generated, specifying in a first control section common content placement and at least one of a common style and a common navigation arrangement for each of said resultant web pages to be generated, wherein the common style comprises variable controls;

receive a first subordinate web page specification defining first content for a first resultant web page to be generated, specifying said first content for said first resultant web page to be generated, and referencing in a second control section the master specification, deferring to the master specification for content placement and at least one of style and navigation, wherein the first subordinate web page specification comprises a first subordinate style specified as first subordinate control values;

receive a second subordinate web page specification defining second content for a second resultant web page to be generated, specifying said second content for said second resultant web page to be generated, and referencing the master specification, deferring to the master specification for content placement and at least one of style and navigation, wherein the second subordinate web page specification comprises a second subordinate style; and generate said first and second resultant web pages with said first content being placed, styled and/or having a common navigation arrangement in accordance with said common placement and a first merged style that comprises the first subordinate style merged into the common style, and said second content being placed, styled and/or having a common navigation arrangement in accordance with said common content placement and a second merged style that comprises the second subordinate style merged into the common style;

wherein said first control section of said master specification comprises at least one variable control, and said second control section of said first subordinate web page specification supplies a control value for one of said at least one variable control, wherein said first subordinate web page specification further specifies other control information in said second control section; and said generating of said first resultant web page further comprises merging said other control information into said first control section.

20. The article of claim 19, wherein said master specification and both of said first and second subordinate web page specifications express the respective specifications using a markup language having language elements for specifying control information in a control section;

said specification of at least one of a common style and a navigation arrangement comprises specifying at least one of a reference to a style definition and a reference to a navigation arrangement in the control section of the master specification;

said first and second subordinate web page specifications specify first and second other control information in first and second control sections of the first and second subordinate web page specifications respectively; and said programming instructions operate the apparatus to perform each of said generating of said first and second resultant web pages in a manner that includes merging of said specification of at least one of a reference to a style definition and a reference to a navigation arrangement in the control section of the master specification and the corresponding one of said first and second other control information in the control section of the corresponding one of said first and second subordinate web page specifications.

21. The article of manufacture of claim 19, wherein said master specification and both of said first and second subordinate web page specifications express the respective specifications using a markup language having language elements for specifying control information in a control section;

said specification of common content placement comprises specification of a content section whose content is to be included from a referencing subordinate web page specification; and said first and second subordinate web page specifications specify said first and said second content in first and second content sections of said first and second subordinate web page specifications respectively; and said programming instructions operate the apparatus to perform each of said generating of said first and second resultant web pages in a manner that includes merging a corresponding one of said specified first and second contents in said first and second content sections of said first and second subordinate web page specifications into the content section of the master specification.

22. A web page generation method comprising:

receiving a master specification defining a design for one or more resultant web pages to be generated, specifying in a first control section at least one of common style and navigation arrangement and, in a first content section, first content placement for each of the one or more resultant web pages to be generated, wherein the common style comprises variable controls;

receiving a first subordinate web page specification defining first content for a first resultant web page to be generated, referencing in a second control section the master specification for content placement and at least one of style and common navigation, and specifying in a second content section said first content, wherein the first subordinate web page specification comprises a first subordinate style specified as first subordinate control values; and generating said first resultant web page, adopting said first control section and first content section of said first specification and merging said specified first content into said first content section, resulting with said first content being placed, styled and/or having a common navigation arrangement in accordance with common placement and at least one of style and navigation arrangement specified by said master specification and a first merged style that comprises the first subordinate style merged into the common style;

wherein said first control section of said master specification comprises at least one variable control, and said second control section of said first subordinate web page specification supplies a control value for one of said at least one variable control, wherein said first subordinate web page specification further specifies other control information in said second control section; and said generating of said first resultant web page further comprises merging said other control information into said first control section.

23. The method of claim 22, wherein said master specification and said first subordinate web page specification express the respective specifications using the XHTML having a <head> section for specifying control information;

said specification of at least one of a common style and a navigation arrangement comprises specifying at least one of a reference to a style definition and a reference to a navigation arrangement in the <head> section of the design specification; and said generating of said first resultant web page comprises adopting said <head> section of said design specification.

24. The method of claim 22, wherein said master specification and said first subordinate web page specification express the respective specifications using XHTML having language elements for specifying control information in a control section;

said master specification specifies said content placement by specifying within said design specification a <body> section whose content is to be included from a referencing subordinate web page specification; and said first subordinate web page specification specifies said first content by specifying within said first subordinate web page specification a <body> section; and said generating of said first resultant web page comprises merging the content of the <body> section of the subordinate web page specification into the <body> section of the design specification.

25. The method of claim 22, wherein said master specification further specifies in a second content section, second content placement for each of the one or more resultant web pages to be generated, and said first subordinate web page referencing said first content section of said master specification for said first content placement;

said method further comprises receiving a second subordinate web page specification defining second content for said second content placement for said first resultant web page to be generated, referencing in a third control section the second content placement of the master specification for content placement and at least one of style and common navigation, and specifying in a third content section said second content; and said generating of said first resultant web page further comprises merging said specified second content into said second content section, resulting with said second content being placed, styled and/or having a common navigation arrangement in accordance with said common placement and at least one of style and navigation arrangement specified by said master specification.

26. An apparatus comprising:

storage medium having stored therein a plurality of programming instructions which, when executed, operate the apparatus to receive a master specification defining a design for one or more resultant web pages to be generated, specifying in a first control section at least one of common style and navigation arrangement, and in a first content section content placement for each of the one or more resultant web pages to be generated, wherein the common style comprises variable controls;

receive a first subordinate web page specification defining first content for a first resultant web page to be generated, referencing in a second control section the master specification, deferring to the master specification for content placement and at least one of style and common navigation, and specifying in a second content section said first content, wherein the first subordinate web page specification comprises a first subordinate style specified as first subordinate control values; and generate said first resultant web page, adopting said first control section and first content section of said master specification and merging said specified first content into said first content section, resulting with said first content being placed, styled and/or having a common navigation arrangement in accordance with said common placement and at least one of style and navigation arrangement specified by said master specification, and a first merged style that comprises the first subordinate style merged into the common style; and a processor coupled to the storage medium to execute the programming instructions;

wherein said second specification further specifying other control information in said second control section;

and said programming instructions operate the apparatus to effectuate said generating of said first resultant web page, merging said other control information in said adopted first control section, wherein said first control section of said master specification comprises at least one variable control, and said second control section of said first subordinate web page specification comprises a control value for one of said at least one variable control.

27. The apparatus of claim 26, wherein said master specification and said first subordinate web page specification express the respective specifications using the XHTML having a <head> section for specifying control information;

said specification of at least one of a common style and a navigation arrangement comprises specifying at least one of a reference to a style definition and a reference to a navigation arrangement in the <head> section of the design specification;

and said programming instructions operate the apparatus to effectuate said generating of said first resultant web page, adopting said <head> section of said design specification.

28. The apparatus of claim 26, wherein said master specification and said first subordinate web page specification express the respective specifications using XHTML having language elements for specifying control information in a control section;

said master specification specifies said content placement by specifying within said design specification a <body> section whose content is to be included from a referencing subordinate web page specification; and said first subordinate web page specifies said first content by specifying within said first subordinate web page specification a <body> section; and said programming instructions operate the apparatus to effectuate said generating of said first resultant web page, merging the content of the <body> section of the subordinate web page specification into the <body> section of the design specification.

29. The apparatus of claim 26, wherein said master specification further specifies in a second content section, second content placement for each of the one or more resultant web pages to be generated, and said first subordinate web page referencing said first content section of said master specification for said first content placement;

said programming instructions further operate the apparatus to receive a second subordinate web page specification defining second content for said second content placement for said first resultant web page to be generated, referencing in a third control section the second content placement of the master specification for content placement and at least one of style and common navigation, and specifying in a third content section said second content, and merge said specified second content into said second content section, resulting with said second content being placed, styled and/or having a common navigation arrangement in accordance with said common placement and at least one of style and navigation arrangement specified by said master specification.

* * * * *

UNITED STATES PATENT AND TRADEMARK OFFICE
CERTIFICATE OF CORRECTION

| | | |
|---|---|---|
| PATENT NO. | : 7,971,138 B2 | |
| APPLICATION NO. | : 09/816552 | |
| DATED | : June 28, 2011 | |
| INVENTOR(S) | : Igra | |

It is certified that error appears in the above-identified patent and that said Letters Patent is hereby corrected as shown below:

On sheet 1 of 4, in figure 1, Ref. Numeral 104, line 8, delete "</Fram1>" and insert -- </Frame1> --, therefor.

In column 1, line 31, delete "mark up" and insert -- markup --, therefor.

In column 5, line 38, delete "incorpating" and insert -- incorporating --, therefor.

In column 7, line 39, in Claim 9, before "a reference" delete "specification of".

In column 7, line 43, in Claim 10, before "and" delete "wherein".

In column 11, line 20, in Claim 21, before "said" delete "and".

In column 11, line 20-24, in Claim 21, delete "said first and second subordinate web page specifications specify said first and said second content in first and second content sections of said first and second subordinate web page specifications respectively; and" and insert the same on line 21 below "specification;" as a separate paragraph.

In column 12, line 6, in Claim 23, before "XHTML" delete "the".

In column 13, line 31, in Claim 27, before "XHTML" delete "the".

In column 14, line 10, in Claim 28, after "page" insert -- specification --.

Signed and Sealed this
Eighth Day of November, 2011

David J. Kappos
*Director of the United States Patent and Trademark Office*